1,876,384

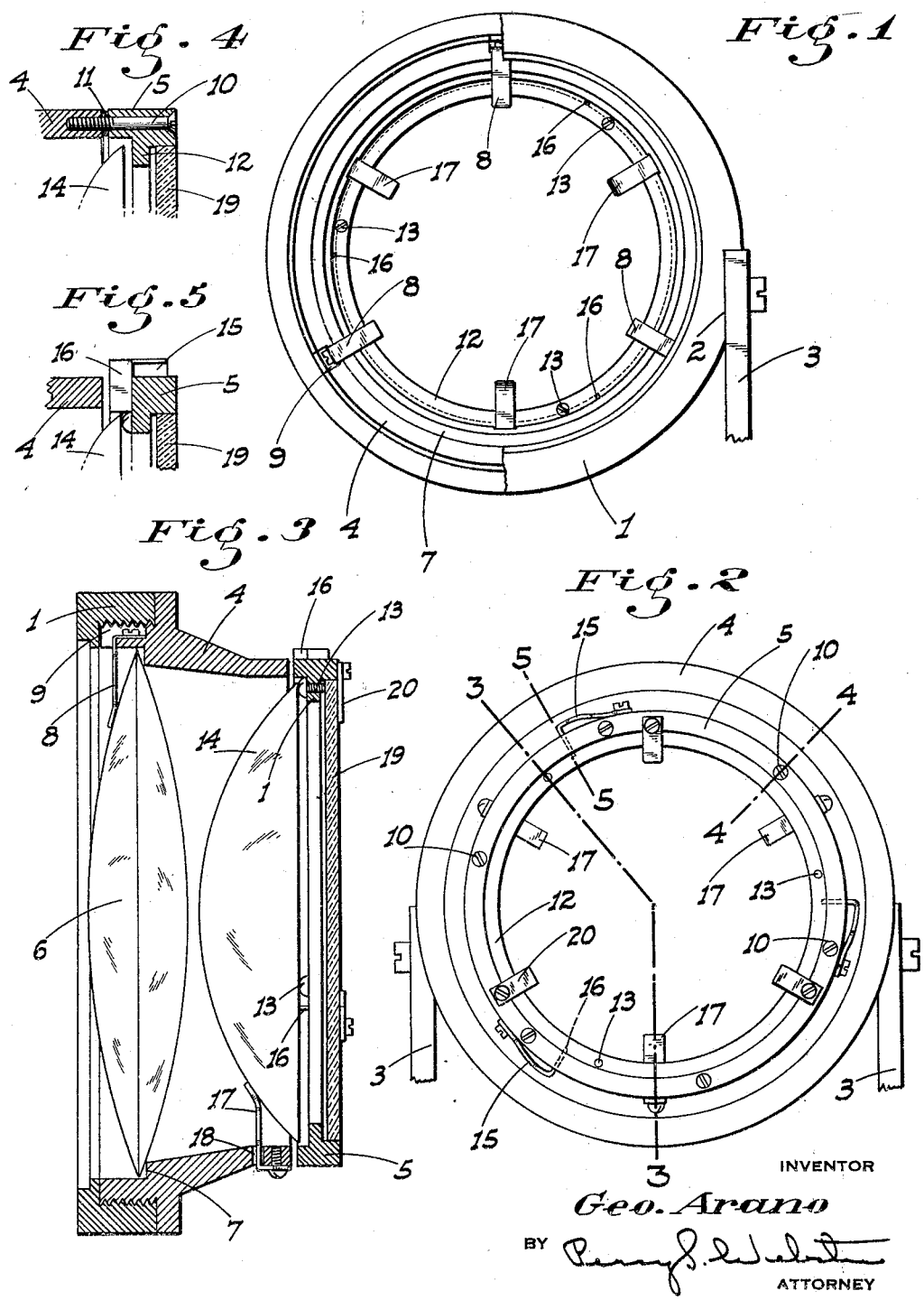
Sept. 6, 1932. G. ARANO 1,876,384
LENS HOLDER FOR PROJECTION LAMPS
Filed Dec. 27, 1930
INVENTOR
Geo. Arano Patented Sept. 6, 1932

UNITED STATES PATENT OFFICE

GEORGE ARANO, OF MODESTO, CALIFORNIA

LENS-HOLDER FOR PROJECTION LAMPS

Application filed December 27, 1930. Serial No. 505,038.

This invention relates to projection lamps, and particularly to the holders in which the lenses are mounted. These lenses are arranged in tandem in a single holder, which holder is necessarily somewhat close to the carbons, which are the source of light and from which considerable heat is radiated, so that the lenses and holder are affected by this heat. When supporting the lamp after a certain lapse of time, all the parts are cold. With the creation of the light-arc from the carbons and the consequent generation of heat, such heat is transmitted directly to the center of the lens, rapidly heating the same. Some of the heat is imparted to the holder both from the lens itself and from the arc. Due to the large continuous metal area of the holders or of the metal parts with which they contact, the heat initially imparted only to the rear end of the holder is rapidly carried away, leaving such end of the holder relatively cold. The thin rim of the lens, contacting with the holder, is therefore kept chilled, and this results in uneven heating and expansion of the lens which frequently causes the same to fracture. This of course necessitates replacement of the lens, and since such lenses are somewhat expensive, such replacement adds considerably to the cost of operations.

The principal object of my invention is to provide a holder for the purpose so constructed that its portion nearest the rear lens (which is the one of course most directly affected by the heat) will retain most of the heat imparted thereto, and will be heated evenly with the lens. At the same time, the forward portion of the holder will be maintained in a relatively cool condition corresponding to that of the front lens. Uneven heating and expansion and the resultant fracture of either lens is therefore greatly reduced, if not entirely eliminated.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a front end of the holder with the lenses removed and the supporting spring partly broken away.

Fig. 2 is a rear end view of the holder.

Fig. 3 is a longitudinal section on the line 3—3 of Fig. 2 showing the lenses in place.

Fig. 4 is a fragmentary section on the line 4—4 of Fig. 2.

Fig. 5 is a similar view on the line 5—5 of Fig. 2.

Referring now more particularly to the characters of reference on the drawing, the numeral 1 denotes the supporting member of the holder,—an internally threaded ring whose outer periphery is notched on its opposite sides as at 2 to form seats for the upper ends of supporting posts 3 which are secured to the ring and are mounted on the base of the projection lamp in any suitable way. The holder itself comprises a main front member 4 and a rear member 5 initially separated from the member 4. The member 4 is of substantially cylindrical form and is threaded at its forward end to engage the threads of the ring 1. The bore of the member 4 at its front end is sufficiently large to receive the front lens 6, whose rearward movement is limited by an inwardly projecting shoulder 7 formed with the member 4. The lens is yieldably held against forward movement by a plurality of flat springs 8 which are mounted in recesses 9 provided in the threaded portion of the member 4 and which project radially toward the axis of the holder and at their inner ends engage the lens.

The rear member 5 is in the form of a relatively short ring whose bore is the same as that of the corresponding end of the member 4. This ring is secured to the adjacent end of the member 4 by a plurality of circumferentially spaced screws 10 of relatively small cross-sectional area. The parts are maintained in permanently spaced relation by washers 11 disposed about the screws between the members 4 and 5. A flange 12 projects inwardly from the ring intermediate its ends and supports a plurality of circumferentially spaced pins 13 which are preferably in the form of screws whose rounded heads project forwardly from the flange while their opposite ends project rearwardly of the same.

The rear lens 14, the back face of which is flat as usual, is of somewhat smaller diameter than the bore of the ring 5 at the front and bears against the heads of the pins 13. To hold the lens in concentric and centralized relation to the ring I provide a plurality of flat springs 15 which are disposed outside the ring and extend about the same and are secured at one end thereto.

Extensions 16 on the free ends of these springs project radially of the ring and through the same ahead of the flange 12 or in position to engage the peripheral edge of the lens, the springs being under tension when the lens is thus engaged. To hold the lens against the pin heads I provide flat radially extending springs 17 which engage the forward face of the lens and project through slots 18 to the outside of the member 4 to which they are secured.

From the above described features of construction it will therefore be seen that the rear lens only has metal connection with the holding ring 5 at a few small points, namely the rounded heads of the pins 13 and the relatively thin spring extensions 16. Relative expansion of the holder and lens, or any difference in their relative heats, does not materially affect the lens. It will be seen also that the metal connections between the ring 5 and the forward member 4 are also of small area, being solely the screws 10. But little of the heat of the ring 5 will therefore be transmitted to said forward member, and such heat will be retained in the ring, so that the lens and ring will heat evenly and retain their heats in proportionate degrees. Also, the always relatively cool lens may have a comparatively large area of contact with the adjacent portion of the holder without danger of fracture, since such portion always remains in a correspondingly cool condition. The springs 17 even though they have a relatively large area of engagement with the rear lens do not become overheated and affect the lens, since these springs are connected to the front member 4 and not to the rear end of the highly heated ring 5.

To protect the back of the rear lens from being pitted from carbon emanations a disc 19 of plain glass is mounted in the ring 5 back of the flange 12 and bears against the rear ends of the pins 13. Radially extending springs 20 are secured on the back edge of the ring and engage the disc to prevent it falling out. The edge of this disc contacts with the bore of the ring, but such disc can stand more heat without damage than the lenses, and it must be replaced ever so often anyway, as its surface becomes pitted and relatively opaque.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A lens holder including a ring of a bore larger than the diameter of a lens, circumferentially spaced and relatively small members mounted in the ring and against which the back of the lens bears, and relatively thin elements mounted on the ring to engage the edge of the lens at circumferentially spaced points and hold the same in spaced relation to the rings.

2. A lens holder including a ring of a bore larger than the diameter of a lens, circumferentially spaced and relatively small members mounted in the ring and against which the back of the lens bears, radially yieldable springs mounted on the ring in circumferentially spaced relation, and radially disposed thin extensions on the springs to engage the edges of the lens to hold the latter centralized in the ring.

3. A lens holder including a ring of a bore larger than the diameter of a lens, circumferentially spaced and relatively small members mounted in the ring and against which the back of the lens bears, relatively thin elements mounted on the ring to engage the edge of the lens at circumferentially spaced points and hold the same in spaced relation to the rings, additional members engaging the front face of the lens, and means separate from but associated with the ring on which said additional members are mounted.

4. A holder for double lenses comprising a cylindrical body member, means for supporting said member in a fixed position, means in and adjacent the front end of the member to support a front lens, a ring disposed rearwardly of the member in axial alinement therewith, elements of relatively small sectional area between and connecting the member and ring and maintaining them in spaced relation, and means for mounting a rear lens in the ring in a manner to hold said lens from direct contact with the ring at any point.

5. A structure as in claim 4, with flat radially disposed springs engaging the front face of the rear lens and mounted on said member.

In testimony whereof I affix my signature.

GEORGE ARANO.